United States Patent [19]

Matyas

[11] Patent Number: 4,654,059
[45] Date of Patent: Mar. 31, 1987

[54] MULTISTAGE ROTARY DUST COLLECTOR

[75] Inventor: Laszlo Matyas, Coquitlam, Canada

[73] Assignee: Rotoclean Industrial Corporation, Coquitlam, Canada

[21] Appl. No.: 791,080

[22] Filed: Oct. 24, 1985

[30] Foreign Application Priority Data

Oct. 31, 1984 [CA] Canada .................................. 466662

[51] Int. Cl.⁴ ............................................ B01D 46/00
[52] U.S. Cl. ........................................ 55/283; 55/290;
55/302; 55/403; 55/502; 55/429; 55/432
[58] Field of Search ...................... 55/96, 97, 283, 290,
55/302, 328, 337, 400–408, 429, 432, 502;
209/288, 289; 210/402, 393

[56] References Cited

U.S. PATENT DOCUMENTS

| 367,858 | 8/1887 | Smith . | |
|---|---|---|---|
| 1,088,952 | 3/1914 | Wilkey . | |
| 1,397,001 | 11/1921 | Garner . | |
| 1,860,697 | 5/1932 | Traviss . | |
| 2,167,786 | 8/1939 | Taylor | 55/408 |
| 2,244,165 | 6/1941 | MacFarland et al. | 55/408 |
| 2,648,396 | 8/1953 | Kirby . | |
| 2,795,292 | 6/1957 | Richards . | |
| 2,994,407 | 8/1961 | Van Diepenbroek . | |
| 3,045,409 | 7/1962 | Kronstad . | |
| 3,060,663 | 10/1962 | Morris et al. . | |
| 3,362,140 | 1/1968 | Mott . | |
| 3,443,696 | 5/1969 | Schutte . | |
| 3,475,883 | 11/1969 | Sullivan | 55/290 |
| 3,653,187 | 4/1972 | Petersen . | |
| 3,727,383 | 4/1973 | Neitzel . | |
| 3,778,982 | 12/1973 | Birke . | |
| 3,816,981 | 6/1974 | Carnewal et al. . | |
| 3,841,066 | 10/1974 | Wakeen . | |
| 4,029,485 | 6/1977 | Siwersson et al. . | |
| 4,108,778 | 8/1978 | Lambert et al. | 55/337 |
| 4,193,779 | 3/1980 | Hencke . | |
| 4,222,754 | 9/1980 | Horvat | 55/290 |

FOREIGN PATENT DOCUMENTS

| 233616 | 4/1961 | Australia . | |
|---|---|---|---|
| 503341 | 5/1954 | Canada . | |
| 561498 | 8/1958 | Canada . | |
| 632311 | 12/1961 | Canada . | |
| 670224 | 9/1963 | Canada . | |
| 940055 | 1/1974 | Canada . | |
| 1025372 | 1/1978 | Canada . | |
| 1059931 | 8/1979 | Canada . | |
| 206706 | 8/1939 | Switzerland | 55/403 |
| 311180 | 1/1956 | Switzerland . | |
| 368368 | 5/1963 | Switzerland . | |

Primary Examiner—Bernard Nozick
Attorney, Agent, or Firm—Wenderoth, Lind & Ponack

[57] ABSTRACT

An apparatus and method for removing particulate solids from gaseous streams wherein a multi-sectional separator drum rotates at high speed within a casing, there being air seal means effectively sealing each of the sections from each other in the space between the casing and the rotating drum. Within each of the sections, the periphery of the drum is foraminous with an air flow space of diminished radius inwardly of the periphery through which the airstream is withdrawn in a generally axial direction, through fan blades which rotate with the drum, into an annular flow space between the foraminous periphery of the succeeding separator section of the drum and the casing. The dirty airstream is introduced tangentially to the drum in the direction of rotation thereof in the first separator section and proceeds through each succeeding separator section of the drum until it is discharged as a cleaned gas stream from the last of the separator sections. In the case of very fine screens or filters forming the foraminous periphery of the separator sections compressed air cleaning means are provided to purge the screens or filters of deposited solids. Rotation of the separator drum and movement of the airstream through the apparatus sets up boundary layer conditions surrounding the foraminous periphery in each of the separator sections causing the solid particles to collect in a collection zone from which they are guided to solids removal means below each of the separator sections.

16 Claims, 12 Drawing Figures

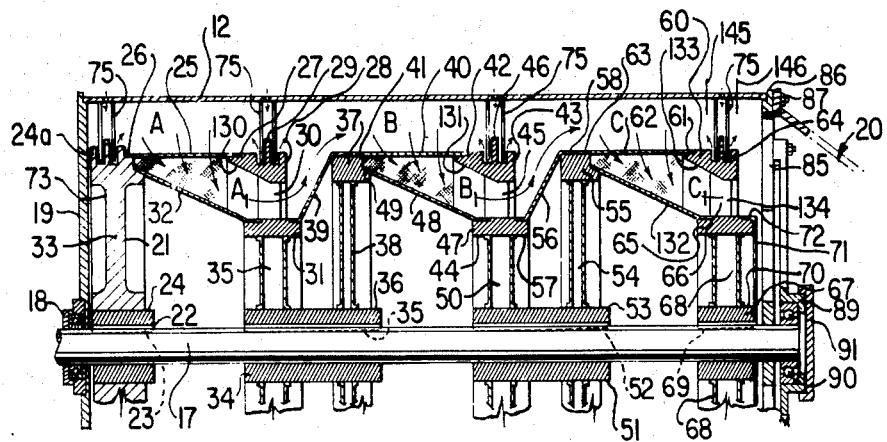

MULTISTAGE ROTARY DUST COLLECTOR

FIELD OF THE INVENTION

This invention relates to the separation of solid particles from air streams and the like. More particularly, the invention relates to a novel apparatus and method for removing entrained solid particles from dust contaminated air streams produced in industrial environments so as to provide a clean air stream suitable for recycling or discharge to the atmosphere.

BACKGROUND ART

The cleaning of dusty air still presents many problems, despite the many proposals in the art for its accomplishment. Where conventional filtration is employed the filters load up with dust, and elaborate provision needs to be made for cleaning the filters, resulting in the need for over-capacity to provide for shutting down of individual filter units during the cleaning process, while maintaining the apparatus in operation. Cyclone dust collectors are bulky, and tend to discharge a substantial amount of dust in the fine size ranges—requiring a substantial final filtering operation to produce an acceptably clean air discharge. Wet scrubbers present the problem of sludge disposal—usually in ponds. Electrostatic precipitators present other problems, including the need for handling of the high voltages involved. To date, the provision of an economical means of cleaning dusty air, involving minimal floor space and minimal mechanical and electrical complication, has remained an elusive goal in the art.

SUMMARY OF THE INVENTION

The present invention has as its principal object the provision of a dust separator and method of dust removal which is compact, efficient, versatile in application and which substantially eliminates the problems inherent in the systems discussed above.

According to the invention, there is provided an apparatus in which a generally cylindrical separator drum rotates within a housing. The separator drum may be divided into a plurality of axially spaced sealed separator sections, in each of which sections the periphery of the drum is formed of foraminous material adapted for flow of gas therethrough. Radially inwardly of the foraminous periphery of each of the sections there are generally frusto-conical or cylindrical air impermeable members forming a gas flow space radially inwardly of the foraminous material forming said periphery communicating in a generally axial direction with an annular space radially outward from the periphery of an adjacent section or, in the case of the last of the said sections, or in case there is only one section, communicating with a source of suction such as an exhaust fan. Fan blades fixedly mounted on the separator drum to rotate therewith are disposed within said gas flow space at the downstream side of each of said sections. Radially outwardly extending air seal flanges extend outwardly from the periphery of the drum at each end of each of said sections. The housing includes cover means enclosing the separator drum and so arranged as to provide an annular space between the periphery of the drum and the inside of the cover means. The cover means is provided with radially inwardly projecting circumferential cross sectionally U-shaped flanges adapted to cooperate with each of the air seal flanges on the drum to provide an air seal between the separator sections of the separator drum in the annular space between the drum periphery and the cover means. Dirty gas inlet means are arranged to deliver dirty gas to the annular space between the periphery of the drum and the cover means of the first of said separator sections, and each of said separator sections is provided with deposited solids collection and removal means. Clean gas removal means operatively connect the last of the separator sections of the drum with the said suction means. There are chute means within the annular space between the drum periphery and the cover means in each of the sections to guide deposited solids from the outer periphery of said space to the deposited solids collection and removal means and there are motor means for rotating the separator drum at a pre-determinable operational rate of rotation, the whole arrangement being such that in operation the rotation of the drum and the movement of dirty gas through the apparatus sets up a boundary layer surrounding the foraminous periphery of each of said separating sections in which solid particles are thrown outwardly to be directed to the deposited solids and removal means under guidance of the chute means.

The openings in the foraminous material forming the periphery of the separator sections of the drum are generally larger than the particle size of the dust which is being removed, since the separating action is not based upon conventional screening or filtering and it is desired to avoid the clogging that takes place when screens or filters are used in a conventional manner. In certain applications where extreme fines penetrate to the final section of the separator the foraminous material may be formed of filter cloth, in which case special arrangements may be employed to permit periodic cleaning of the filter. However, the principle upon which the separator operates minimizes the extent to which solid particles actually contact the foraminous periphery of the drum. A typical operating rotational speed for the separator drum of 18" diameter is approximately 2000 rpm. At this speed of rotation the linear speed of the periphery of the drum will be approximately 9,428 feet per minute, which is somewhat faster than the velocity of the air entering if one considers the dirty air inlet as delivering, say, 1,500 cubic feet per minute tangentially to the drum periphery at a velocity of 5,000 feet per minute.

The foraminous periphery of the drum in the first section will typically be a screen having a mesh size of 12×12 (U.S. standard). The ratio of opening to total area is about 3:10. The velocity of the air is thus increased in passage through the screen. The rotation of the drum together with the tangential momentum of the entering air stream causes the air to flow around the annular space between the screen and the cover at circumferential velocities which are lowest adjacent the cover and highest adjacent the screen. Solid particles carried by the entering air will tend, by virtue of their inertia, to migrate outwardly towards the cover, and this tendency is greater the closer a particular particle is to the screen. Moreover, those particles which do intersect the screen will tend to do so with a shallow angle of incidence and therefore a correspondingly low probability of passing through the screen openings. In the result, the solid particles concentrate in a boundary layer extending from the interior surface of the cover to a point outside the screen itself. As the layer moves down the downwardly moving side of the screen, the force of gravity combines with the inertial force to move the solid particles away from the screen and the concentration of solid particles in the boundary layer moves outwardly and, guided by the chute, flows into the solids collection means which is suitably located below the centre of the drum.

In practice, under conditions of typical dust loading of the dirty air, usually less than 1% of the dust particles will actually pass through the screen of the first separator section and be carried through the gas flow space under the screen, past the fan blades between the first and second sections and outwardly into the annular space outside the screen of the second section.

In the second section of the separator the small amount of dust which has been carried through the screen of the first section flows around and into the boundary layer between the screen and the interior of the cover means of the second section. Once again, because of the effect caused by the air flow and the rotation of the drum, very few of the remaining dust particles are able to reach the screen itself and, of those that do reach it, only a very small portion pass through. Almost all of the particles remain in the boundary layer until they are thrown out of it and into the chute leading to the solids collection means of the second section. The screen used in the second section may be of the same size mesh as the screen in the first section or it may have a smaller mesh size. Only a relatively small proportion of the particles which enter the second section will pass through the screen of that section, depending on the type of screen used.

In the third section (if a third section is present), the screen may be replaced by a filter cloth made of suitable woven fabric such as polypropylene fibre or glass fibre. In this section a similar boundary layer is formed as in the case of the first and second sections, but the filter cloth prevents virtually all of the remaining particles from passing through the periphery of the drum into the discharge duct which leads to the intake end of the exhaust fan on the downstream end of the separator. Again, because of the separating action which takes place in the boundary layer, only a relatively small proportion of the solid particles which enter the third section will impinge on the surface of the filter cloth before arriving at the chute directing them to the solids removal means of the third section. Of those particles which do impinge on the filter surface, most will be deflected outwardly into the boundary layer. A very small proportion of the particles impinging on the surface of the filter will lodge in the interstices of the filter and over time there will be a sufficient quantity of lodged particles to perceptibly increase the pressure differential across the filter. When this occurs, the normal operating pressure differential across the screen is restored by a short purging blast of compressed air, in a manner to be described in greater detail below. This blast of compressed air dislodges the particles that have become deposited on the filter, moving them radially outwardly from the filter surface and into the boundary layer, from where they are directed to the chute means and into the solids collection means of the third section of the separator.

As will be understood from the foregoing general description of the operation of the separator of the invention, the unique separating action is mainly brought about in the annular space between the surface of the screen or filter and the interior surface of the cover in each of the sections, and this separating action is set up as a result of the combined effect of the rotation of the drum and the movement of the air through the several separator sections. The establishment of the conditions of operation resulting in the formation of the boundary layer surrounding the drum periphery in the various separator sections requires a certain minimum circumferential speed of the drum periphery. This minimum speed varies somewhat, depending upon a number of variable factors, not all of which are fully understood. For practical purposes, it appears that it is necessary that the circumferential speed of the drum periphery, of at least the first separator section be not less than about 9,000 feet per minute in order to establish effective boundary layer conditions which are stable during the variations encountered in normal operation. No upper limit of circumferential speed for the periphery of the drum for purposes of establishing boundary layer conditions has been encountered, and the upper limit for the operating circumferential speed of the periphery of the drum appears to be dictated by considerations of sound mechanical design having regard to the strength and weight of the materials used to construct the drum, etc. A satisfactory design circumferential speed for the periphery of the drum is approximately 9,500 feet per minute, regardless of the diameter of the drum.

The invention thus comprehends a novel method of removing solid particles from dirty gas streams containing the same, which involves introducing the dirty gas stream under motivation of downstream suction into a generally annular sealed flow space surrounding a generally cylindrical foraminous member, while rotating the foraminous member about its cylindrical axis so as to impart to it a circumferential velocity of at least 9,000 feet per minute; withdrawing said gas stream from said sealed annular flow space through said foraminous member in a generally axial direction while confining it within an annular flow path of diminished radius, whereby to establish boundary layer conditions within said sealed annular flow space causing solid particles to collect in a solids collection zone; guiding the solid particles from said solids collection zone to a place of discharge and discharging them.

The withdrawn air stream is passed axially and radially into the sealed annular flow space surrounding a second generally cylindrical foraminous member rotating about the same axis as the screen through which the gas stream has been withdrawn and the gas stream is withdrawn through said second foraminous member in a generally axial direction while confining it within an annular flow path of diminished radius whereby to establish boundary layer conditions within said sealed annular flow space surrounding said second foraminous member causing solid particles to collect in a solids collection zone associated with said second sealed annular flow space, said solid particles being guided from said solids collection zone to a place of discharge and being there discharged from said second sealed annular flow space surrounding said second foraminous member. The air stream withdrawn through said second foraminous member may be discharged into a third sealed annular flow space surrounding a third generally cylindrical foraminous member rotating on the same axis as the first and second foraminous members or it may be discharged axially to the downstream suction means as a clean gas stream.

The design of a separator according to the invention will depend upon the particular dust collecting task which is to be performed. There are standards relating to different forms of industrial dust which set out the minimum design duct velocities for the transport of each particular type of dust, and these generally vary between about 1,500 feet per minute (in the case of paper machines) to about 4,500 feet per minute (in the case of the drilling of panels containing asbestos). The number and size of the installations to be serviced by the dust collector will dictate the number of cubic feet per minute that must be handled. Assuming that the last stage of the dust collector will embody a filter or very fine mesh screens in all stages, the air volume to filter or screen surface area ratios can typically range from 250 to 1 to 2,000 to 1. Knowing the Volume of air to be handled per minute, the designer can select an appropriate diameter and length for the drum section in which the filter will be mounted, which, for practical purposes, may have a diameter of from 12" to approximately 48". The sections preceding the one containing the filter may have the same drum diameter, with a screen length appropriate to accommodate the calculated flow requirements. A single unit may be designed to handle a flow capacity of approximately 1,000 cubic feet per minute to 150,000 cubic feet per minute. If the total amount of flow which needs to be handled is greater than can conveniently be handled in a single unit, a given installation may contain two or more units operating from a common inlet header with common or separate exhaust fan facilities. The separator of the invention may be fabricated from stainless steel or carbon steel and it may be adapted for high temperature operation by forming the various parts from high temperature resistant materials and employing water cooled bearings and glass fiber filter material, or stainless steel screens, or similar high temperature material, thus enabling the separator to be used in a variety of applications where the gas stream containing the dust components to be separated is at an elevated temperature such, for instance, as may be the case where the air or gas being cleaned originates in a furnace or other installation involving high temperature treatment of materials.

The invention and its operation will be more particularly understood from the following detailed specification taken in conjunction with the accompanying drawings illustrating one embodiment of the invention in which there are three separator sections, the final one of which contains a filter.

BRIEF DESCRIPTION OF THE DRAWINGS

In the drawings:-

FIG. 2 is a partial longitudinal sectional view of the separator arrangement illustrated in FIG. 1, indicating a suitable construction of the drum and cover.

FIG. 3 is a fragmentary longitudinal section illustrating the construction of the air seals between the separator sections.

FIG. 3A is a fragmentary longitudinal cross-section like FIG. 3 illustrating an alternative construction for the air seal.

FIG. 4 is a diagrammatic cross-sectional view taken through the second section of a separator similar to that illustrated in FIG. 1.

FIG. 4A is a diagrammatic cross-sectional view taken through the second section of a separator similar to that illustrated in FIG. 1 illustrating an alternative type of deposited solids removal means.

DESCRIPTION OF THE PREFERRED EMBODIMENTS

Figure 1:
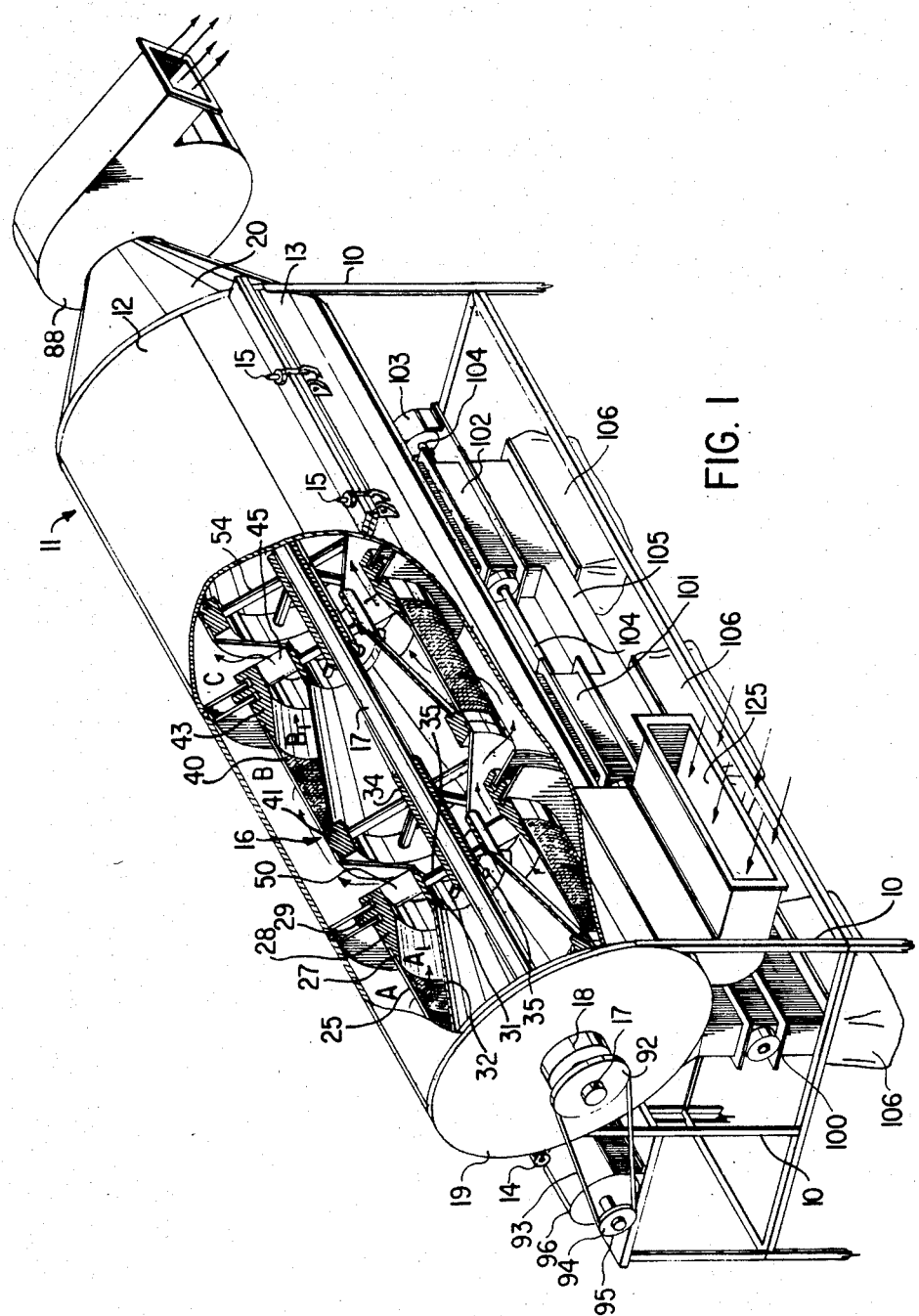
FIG. 1 is a diagrammatic projection of a separator according to the invention, partly cut away to illustrate the air flow and general arrangements of components in the interior thereof.

Referring now more particularly to the drawings, the separator illustrated in FIG. 1 is illustrated as mounted on a base frame 10 which supports the separator at a convenient elevation, to enable the collection and removal of dust from the discharge of the rotary air lock valves or dust boxes in which it is collected and which are centrally located below the separator itself. The cover means or casing of the separator, indicated generally at 11, is generally cylindrical in shape and is made in matching upper and lower halves 12 and 13 so that the upper portion 12 may be removed for access to the interior components. The upper portion may be made in one piece or it may be made in sections corresponding in length to the sections of the drum. It may be hinged to the lower portion along its mating edges as at 14 so that the whole top portion or individual sections of it may be lifted to give interior access for purposes of inspection, maintenance or cleaning. In any event the mating edges of the upper and lower portions 12 and 13 will be provided with suitable sealing means such as neoprene gaskets, providing an airtight seal when the upper portion is secured in the closed position by suitable latches or bolts 15. The separator drum, indicated generally at 16, is mounted on the shaft 17, which is supported at one end by a roller bearing 18 mounted on the outside of the housing end wall 19. The shaft 17 is supported at its other end by a roller bearing 90 centrally mounted on a support bracket 89 within the clean air outlet 20.

The elements of the drum include a drum end plate 21 (see FIG. 2) which has the hub 22 and is secured on the shaft 17 by a key 23 and set screw 24 and which has formed in its periphery the air seal flange 24a. The first separator section screen 25 is mounted at its one side in the screen seating groove 26 formed in the perimeter of the end plate 21 and at its other end in the mounting groove 27 in the sealing ring 28 which carries the air seal flange 29.

Figure 9:
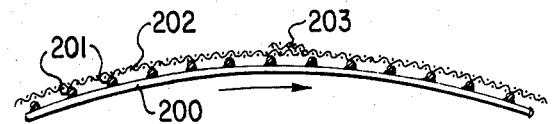
FIG. 9 is an enlarged fragmentary cross-section of the foraminous periphery in each of the separator sections illustrating the construction thereof.

The structure of the screen 25 is illustrated in cross-section in FIG. 9 and is the same in each of the other sections of the separator to be described. It consists of a very coarse screen or grid having circular stringers 200 welded to circumferentially spaced cross-pieces 201 to form a grid which has square openings on the order of approximately 1" square, outer stringers being welded within the mounting grooves already referred to. Overlying the grid cross-pieces 201 is a screen of selected mesh size 202 which may be from about 4 to about 500 mesh, which is stretched around the screen and secured with a conventional overlapping seam 203. Where a filter is used instead of a screen, the construction is exactly the same with the screen 202 being substituted by a filter material.

The sealing ring 28 is supported by the fan blade spokes 30 which extend radially between the sealing ring 28 and the support ring 31, which latter supports one end of the frusto-conical air deflector 32, the other end of which is supported by the seating shoulder 33 in the drum end plate 26. The support ring 31 is spaced from the hub 34 by the pipe spokes 35. The hub 34 is secured to shaft 17 by the key 35 and set screw 36. The second separator section support ring 37 is separated from the hub 34 by the pipe spokes 38 and mounted at one end on support ring 31 and at the other end upon the second separator section support ring 37 is the frusto-conical air deflector 39.

The cylindrical screen 40 of the second separator section is mounted at one end in the mounting groove 41 of the second separator section support ring 37 and at its other end in a mounting groove 42 in the second separator section sealing ring 43 which latter is spaced from the second separator section support ring 44 by the radial fan blade spokes 45. The second separator section sealing ring 43 is formed with the radially outwardly extending sealing flange 46. The second separator sealing ring support ring 44 provides support in the mounting groove 47 for the frusto-conical air deflector member 48 which is supported at its other end upon the mount shoulder 49 in the second separator section support ring 37. The pipe spokes 50 support the second separator section sealing ring support ring upon the hub 51 which is keyed to the shaft 17 by the key 52 and set screw 53, which hub 51 also supports the pipe spokes 54 which support the third separator section support ring 55. The frusto-conical air deflector 56 is mounted at one end in the mounting groove 57 in the second separator section sealing ring support ring and at its other end in the mounting groove 58 in the third separator section support ring 55. The third separator section sealing ring 60 is formed with the mounting groove 61 supporting one end of the cylindrical filter support screen 62, the other end of which is supported in the mounting groove 63 of the third separator section support ring 55.

The third separator section sealing ring 60 is formed with the radially outwardly extending sealing flange 64 and is separated from the third separator section sealing ring support ring 65 by the fan blade spokes 66. The third separator section sealing ring support ring 65 is supported from the hub 67 by pipe spokes 68 which are mounted on the shaft 17 by means of key 69 and set screw 70. The third separator section sealing ring support ring cover plate 71 is supported in the mounting groove 72 in the third separator section sealing ring support ring 65.

The separator drum thus far described is designed to rotate with the driven shaft 17 at a high angular velocity of the order of 2,000 rpm, and it is accordingly necessary that subsequent to its assembly it be dynamically balanced. For this purpose balancing weights may be secured on the inside of the third separator section sealing ring support ring 65 and on the outer side of the drum end plate 21 at the position indicated by 73.

The upper half of the cover 12 and the lower portion 13 are provided with the radially inwardly extending cross-sectionally U-shaped flanges 75, so positioned as to straddle the sealing flanges 24, 29, 46 and 64 which seal the three separator sections from each other. The legs of the flanges 75 are spaced apart by means of a number of circumferentially spaced tubular spacers 76 (see FIG. 3) held in place by bolts 77 and nuts 78. A plurality of circumferentially spaced holes or cut-outs 79 in the upper and lower cover portions 12 and 13 provides communication to the atmosphere from between the legs of the U-shaped flanges 75. Thin felt sealing rings 80 and 81 are secured to the interior surfaces of the legs 82 and 83 of the cross-sectional U-shaped flanges 75, leaving a clearance space between the said felt sealing rings and the surfaces of the sealing flange 29 of the order of 1/32", as at 84.

An alternative seal arrangement is shown in FIG. 3a in which the felt sealing rings 80a and 81a have a smaller internal diameter so that when mounted on the legs 82 and 83 of the radial inwardly extending cross-sectionally U-shaped flanges 75 their radially innermost portions 80b and 81b contact and are pressed outwardly by the bottoms respectively of the annular grooves 80c and 81c. The seal arrangement illustrated in FIG. 3A provides for a more positive seal and minimizes blow backs of dust through the seal should the pressure within the separator become greater than atmospheric as would be the case when the exhaust fan is not functioning or in any embodiments of the invention where the separator is intended to operate without an exhaust fan.

Since the interior of the separator is maintained at sub-atmospheric pressure during operation, atmospheric air will bleed in through the holes 79 between the legs of the U-shaped flanges 75 and past the felt sealing rings as at 84 and as indicated by the arrows on FIGS. 2 and 3. With the arrangement described, there is no contact between the felt sealing rings 80 and 81 and the sealing flanges 29, so there is no frictional loss or heat buildup during operation of the separator while the separator sections are effectively sealed from each other, so that no dust or gas can leave a section otherwise than through the screen or filter. Thus the annular spaces surrounding the screens of the three separator sections may be referred to as sealed annular flow spaces surrounding the respective screens or filter.

The downstream end plate 85 of the separator housing is in the form of an annular ring grooved at 86 to accommodate the cover 12 and providing a flange 87 for attachment of the clean air outlet adapter leading to the exhaust fan 88 which motivates the air stream through the separator apparatus. A cross bracket 89 secured to the end plate at either side thereof provides a mounting for the roller bearing 90 supporting the downstream end of the shaft 17, the whole being closed off by cover plate 91.

The shaft 17 has mounted at its upstream end the vee-belt sheave 92 which is driven by the vee-belt 93 from pulley 94 mounted on a shaft 95 of a drive motor 96 in the direction of rotation indicated by the arrow.

Figure 5:
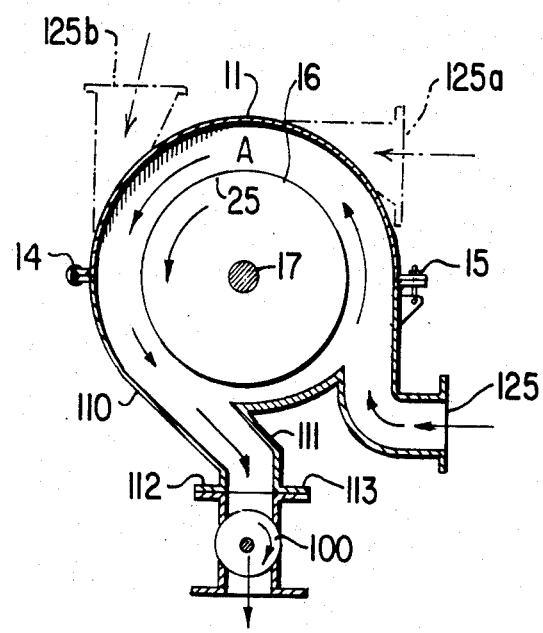
FIG. 5 is a diagrammatic vertical cross-sectional view taken through the first section of a separator similar to that illustrated in FIG. 1, indicating the position of the deposited solids removal means and indicating alternative positions for the dirty air inlet.

As illustrated in FIG. 1, each of the different separator sections has beneath it a rotary air lock valve for the removal of deposited solids. These rotary air lock valves are conventional items which are commercially available and will accordingly not be described in detail. In the arrangement shown illustrated in FIG. 1, the rotary air lock valve 100 discharges the solids deposited in the first separator section and the rotary air lock valve 101 discharges the solids deposited in the second separator section and rotary air lock valve 102 discharges the solids deposited in the third separator section. The rotary air lock valves 100, 101 and 102 are in axial alignment and driven from the motor 103 by the extended drive shaft 104. A supporting structure 105 provides support for solids delivery outlet suitable for attachment of bags 106 in which the deposited solids may be collected and removed. The lower part of the lower half of the cover 13 is shaped to provide guide portions 110 and 111 which together form a chute terminating in flanges 112 and 113 by means of which the rotary air lock valve 100 is secured in position to collect the solids deposited in the first section (see FIG. 5).

Similarly, guide portions 115 and 116 form a chute terminating in flanges 117 and 118 for connection to flanges at the inlet of rotary air lock valve 101 (see FIG. 4).

Figure 6:
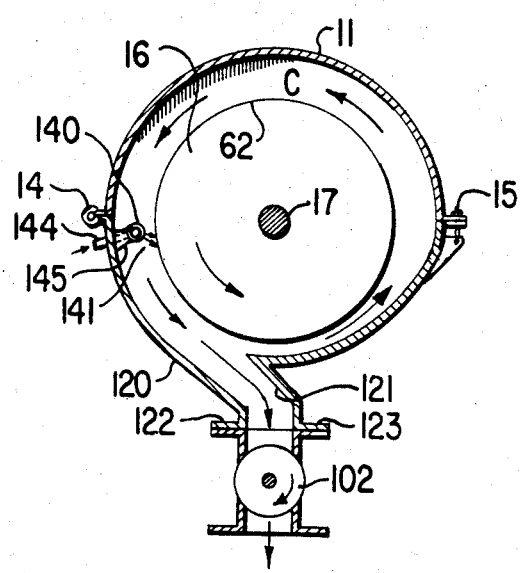
FIG. 6 is a diagrammatic vertical cross-sectional view taken through the third separator section of a separator like that illustrated in FIG. 1, indicating the positioning of the deposited solids removal means and showing the position of the filter cleaning means.

In the third section the guide portions 120 and 121 form a chute terminating in flanges 122 and 123 which are secured to the flanges surrounding the inlet opening of rotary air lock valve 102 (see FIG. 6).

Dirty air inlet 125 enters the first section of the separator in an upward direction to deliver the dirty air upwardly substantially tangentially to the drum and moving in the same direction as the drum surface. In the position illustrated in FIG. 1, the solids carried by the entering air stream must travel at least three-quarters of the distance around the drum 16 in the annular flow space A between the cover means 11 and the first separator section screen 25, before arriving at a point of collection and delivery to the rotary air lock valve 100. This exposes the solid particles to the separating action of the boundary layer action through a relatively long excursion before potential deposit and removal. Depending upon the nature and size of the particles carried by the dirty air stream and the dust loading, such a long excursion in the boundary layer may not be necessary, and it may be desirable to provide for a shorter excursion of the larger and heavier particles in the boundary layer of the first section. In such cases, the dirty air inlet position may be moved to the position shown in dotted lines at 125a so that the dirty air stream is introduced horizontally tangential to the top rotating surface of the drum or even to the drum position indicated by dotted lines at 125b where the dirty air stream is introduced downwardly tangentially to the downwardly moving surface of the drum.

In operation the motor 96 will first be started and will be allowed to bring the separator drum 16 up to its operational speed of rotation which, as already mentioned, will be such as to produce a circumferential peripheral speed of approximately 9,500 feet per minute. When the drum has reached its operational speed, the exhaust fan 88 will be started up, drawing air from the source of dirty air or gas through the dirty air inlet 125. The rotary air lock motor 103 is started at the same time. The air stream proceeds through the dirty air inlet under motivation of the suction produced by the exhaust fan 88 into the annular flow space A between the cover 11 and the screen 25 of the first separator section, the annular flow space A being effectively sealed by the air seal created by the flanges 24 and 29 and the cross-sectional U-shaped flanges 75 at either end of the first section. The solid particles in the air enter the boundary layer created by the rapidly rotating drum and the movement of air through the apparatus and tend to collect in a solids collection zone outwardly from the lower sector of the downwardly moving surface of the drum where they are guided by the chute portions of the lower cover 110 and 111 into the inlet of the rotary air lock valve 100 where they are discharged. Some of the solid particles will not be moved outwardly from the drum periphery sufficiently to be collected in the solids collection zone and will continue around for a second excursion around the drum in the boundary layer. Meanwhile, the air stream which passes inwardly through the screen 25 is withdrawn in a generally axial direction within the annular flow space A1 formed by the outer surface of the frusto-conical deflector 32 and the inwardly facing surface 130 of the sealing ring 28. As the flow passes into the second separator section, it is contacted by the fan blade spokes 30 which contribute to the maintenance of its rotary motion and also restore some of the pressure loss caused by passage of the air stream through the first section. The air stream which is rotating at close to the speed of rotation of the drum is now forced outwardly as it enters the second separator section into the annular flow space B which is sealed by the air seals formed by the flanges 29 and 46 and the cross-sectionally U-shaped flanges 75 and which lies between the inner surface of the cover 11 and the screen 40 in which annular flow space the solid particles which have passed through the screen 25 of the first separator section are subjected to the boundary layer conditions existing in the second section and tend to collect in a solids collection zone outwardly from the lower sector of the downwardly moving side of the drum and be guided by the chute portions 115 and 116 into the inlet of the rotary air lock valve 101 to be discharged.

Meanwhile, the air stream which is passing through the screen 40 is withdrawn in a generally axial direction within the annular flow space B1 formed by the outer surface of the frusto-conical deflector 48 and the inwardly facing surface 131 of the sealing ring 43. As the flow passes into the third separator section it is contacted by the fan blade spokes 45 which, as in the case of the fan blade spokes 30, contribute to the maintenance of its rotary motion and also restore some of the pressure loss caused by the passage of the air stream through the second section. Once again, the air stream which is rotating at close to the speed of rotation of the drum is forced outwardly as it enters the third separator section into the annular flow space which is sealed by the air seals formed by the flanges 46 and 64 and the cross-sectionally U-shaped flanges 75. The sealed annular flow space C between the inner surface of the cover 11 and the filter 62 subjects the relatively few solid particles remaining in the air stream which will generally be of the smallest particle size existing in the original dirty air to the effect of the boundary layer action existing in the annular flow space C and, once again, the solid particles will tend to collect in a solids collection zone outwardly from the lower sector of the downwardly moving side of the drum and be guided by the chute portions 120 and 121 into the inlet of the rotary air lock valve 102, to be discharged.

Meanwhile, the air stream which has passed through the filter 62 is withdrawn from the third separator section in a generally axial direction within the annular flow space of diminished radius $C_1$ formed by the outer surface of the frusto-conical deflector 132 (see FIG. 2) and the inwardly facing surface 133 of the sealing ring 60.

Figure 2A:
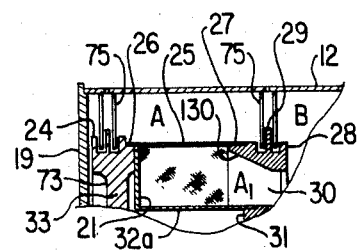
FIG. 2A is a fragmentary longitudinal section taken through the first separator section of a separator like that illustrated in FIG. 2 showing an alternative form of construction for the air deflectors defining the air flow path below the foraminous periphery in each of the separator sections.

While in the foregoing description the operation of the invention has been described in relation to the embodiments illustrated in FIGS. 1 and 2 where the radially inward margin of the annular flow space of diminished radius through which the air stream is withdrawn from a separator section after having passed through the screen thereof is frusto-conical as in the case of deflectors 32, 48 and 132, it is to be understood that the operation of the separator is the same as that already described if the separator drum is constructed employing the generally cylindrical deflectors illustrated in FIG. 2A so that the inner side of air flow space beneath the foraminous members in each of the sections is defined by a cylindrical surface rather than a frusto-conical surface.

For purposes of establishing the boundary layer conditions referred to within the annular space surrounding the foraminous members in each of the sections the important aspect of the flow space radially inwardly of the foraminous members through which the airstream is withdrawn from the section is that the space be annular in cross section.

As the flow passes outwardly from the third separator section it is contacted by the fan blade spokes 134 which contribute to the maintenance of its rotary motion and also restore some of the pressure loss caused by the passage of the air stream through the third separator section. From there the air stream, which is now a clean air stream, passes out through the clean air outlet 20 to the inlet of the exhaust fan 88, from where it is discharged either to the atmosphere or to recirculation to the area of the source of the dust.

Since the foraminous periphery of the third separator section in the embodiment described is a filter rather than an open screen, it is to be expected that very fine particles will tend to be entrapped and to accumulate on its surface and interstices. As is well known in the filter art, the efficiency of filtering is generally improved by the presence of a certain amount of filterable solids on the surface regions of a filter. However, once such buildup proceeds beyond a certain point, the resistance of the filter to the flow of air through it begins to increase quite rapidly. Since the separator of the present invention depends upon the motivation of air through the apparatus by means of downstream suction, any substantial buildup of resistance to flow of the filter in the third section is unacceptable because it will affect the operation of all the upstream components of the system. Consequently, in any separator section of an apparatus according to the invention where a filter is employed as the foraminous periphery of the separator drum, it is necessary to provide for the removal of solids built up in the surface regions of the filter. In the embodiment described, where the third separator section employs a filter, the buildup of unacceptable deposited solids on the filter is controlled by means of a compressed air blast, which is introduced through a delivery head 140 mounted parallel to the surface of the filter 62 in the lower portion of the cover 11, as indicated in FIG. 6. The delivery head 140 extends the length of the filter 162 and contains an axially extending radial slot 141 approximately 0.008" wide for delivery of a curtain-like blast of compressed air directed toward the filter surface in a direction forming a small angle with a tangent to the filter surface at the point of impact. The delivery head 140 is mounted on mounting brackets 142 welded to the inner surface of the lower portion 13 of the cover 11 and compressed air is delivered through compressed air line 144 through a connector 145 extending through the wall of the lower cover portion 13.

Compressed air having pressure of from 80 to 100 pounds per square inch will produce an air blast from the slot 142 which has a velocity substantially greater than the peripheral velocity of the separator drum and it has been found that, upon buildup of deposited solids on the filter 62, a blast duration of 1 to 2 seconds is sufficient to remove the accumulated buildup of deposited solids. Since the undesired buildup of solids on the filter 62 is manifested by an increase in the pressure drop across the filter 62, the compressed air blast is readily controlled by means of a pressure differential solenoid valve in the compressed air line 144 which is actuated by pressure differential across the screen 62. This pressure differential may be measured by pressure sensors located within the cover means 11 at positions indicated by numerals 145 and 146 (see FIG. 2). The compressed air valve actuating control will be set so as to open the valve to produce a compressed air blast of fixed duration (one to several seconds) whenever the pressure differential between the pressure sensor positions 145 and 146 (see FIG. 1) rises above a predetermined value. The particular value chosen in any particular installation will, of course, depend upon the operating conditions and what the desired optimum pressure differential across the filter is determined to be for the particular operating criteria of the installation.

When the air blast is actuated, the curtain of compressed air lifts the deposited solids from the surface of the filter, throwing them outwardly into the boundary layer of the annular flow space C of the third separator section where they collect in the deposited solids collection zone and are guided by chute portions 120 and 121 into the inlet of the rotary air lock valve 102 to be discharged.

It is to be understood that the embodiments illustrated and described which relate to separators composed of three separator sections of which the third section embodies a filter as the foraminous member is for purposes of illustration only. Very fine screens of up to 500 mesh may be used to replace the filter described in the third section of the embodiments described and, dependent upon the specific task the separator is to perform, it may be desirable to employ very fine screens in one or all preceding sections. Where a very fine screen is used in any particular separator section, that is to say a screen of sufficient fineness that most of the solid particles which will impact upon it during operation will be too large to pass through it, it will be desirable to mount a screen cleaning means of the kind already described in each of the sections employing a filter or a very fine screen in order periodically to remove any build-up of deposited solids which may become embedded in the surfaces of the screens. Thus, the separator of the invention contemplates that a separator may embody two or more separator sections and that each of the sections may employ either a relatively coarse screen in which no cleaning means are required or a very fine mesh screen or filter in association with which a screen or filter cleaning means such as that described is desirable. The actual selection of the specific screens or filters to be used depends upon the rational design of the separator having regard to the specific function it will be called upon to perform.

In the foregoing description the discharge of deposited solids has been carried out by means of conventional rotary air lock valves. Alternatively to the rotary air lock valves, various other types of discharge mechanism may be employed. Since the interior of the separator is operating at sub-atmospheric pressure, it is merely necessary that the discharge means employed be such as to prevent the deposited solids from being sucked back into the separator sections while the deposited material is being discharged. One such alternative form of discharge mechanism is illustrated in FIG. 4a, which illustrates such a discharge mechanism mounted under the second section of the separator illustrated in FIG. 1 in place of the rotary air lock valve 101. Referring to FIG. 4a the discharge mechanism consists essentially of a dust trap box 150 having a flanged inlet opening, with flanges 151 and 152 mated with the flanges 117 and 118 at the bottom of the discharge chute formed by chute portions 115 and 116 of the lower cover portion 13. The bottom of the box is normally closed by the closure flap 153 which is hingedly mounted at 154 on a side wall of the box 150. Within the box a normally open flap held open by gravity 155 which may suitably be a sheet of $\frac{1}{8}''$ perspex is swingably suspended on hooks 156 which pass through holes 156a. In normal operation of the separator the separated solid particles will be guided by the chute portions 115 and 116 of the lower portion 13 of the separator cover and will drop into the box 150. When there is sufficient accumulation within the box 150, the flap 153 is swung downwardly about the hinge 154 to dump the contents into a bag or other receptacle, while the opening of the flap 153 causes the flap 155 to snap upwardly due to suction into the closed position against sealing ring 155a during the dumping operation. Since the dumping operation takes only a few seconds, the accumulation of deposited solids above the flap 155 while it is in the closed position will be comparatively minor, and when the flap 153 is swung upwardly to the closed position the flap 155 swings downwardly to the open position and dumps the accumulated solids into the box 150. The interrelated movement of the flaps 153 and 155 may be accomplished in any desired manner, for instance, with an air cylinder, or step-motor, or the flap 153 may be held closed by a torsional spring mounted on the axis of hinge 154 and its opening movement may be linked to the cover of an access opening in the upper part of the dust box 150 behind the flap 155, whereby opening of the flap 153 establishes communication between the interior of the box and the atmosphere. Since the interior of the separator is at sub-atmospheric pressure, the flap 155 will swing upwardly and be held in the closed position by atmospheric pressure until the flap 153 is returned to the closed position and access from the interior of the box 150 to the atmosphere is cut off, at which time the flap 155 will simply drop back under its own weight and the weight of any solids which have accumulated on top of it during the dumping operation. Many other arrangements will suggest themselves to those skilled in the art.

Figure 7:
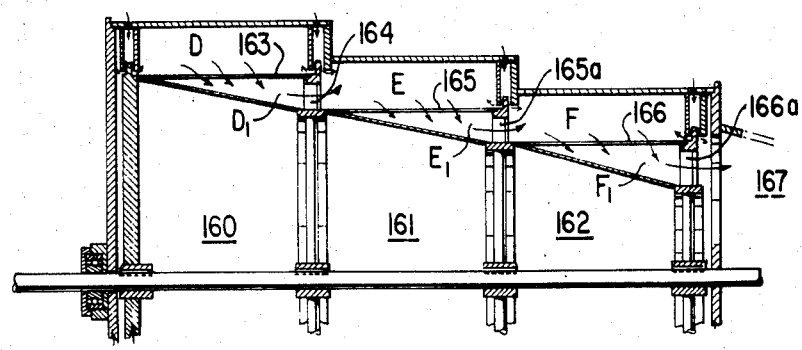
FIG. 7 is a longitudinal partial cross-sectional view of a separator according to the invention, illustrating an alternative form of drum construction.
Figure 8:
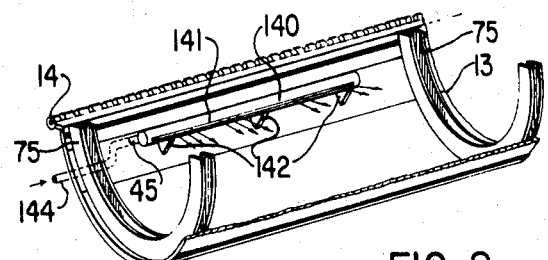
FIG. 8 is a fragmentary projection of the lower portion of the third section of a separator like that shown in FIG. 1 showing the mounting of the compressed air filter cleaner.

A simplified version of the separator drum is illustrated in FIG. 7, which gives a partial longitudinal cross-sectional view through a separator employing the simplified drum construction. In this embodiment, there are three separator sections, indicated generally at 160, 161 and 162. The periphery of the drum in each succeeding separator section is of diminishing diameter so that air flowing through the cylindrical screen 163 of the first section from the annular flow space D surrounding it is withdrawn in a generally axial direction within the annular flow path of axially diminishing radius $D_1$, contacts the fan blade spokes 164 and passes axially into the annular flow space E surrounding the cylindrical screen 165 of the second section from where, after passing through the screen 165, it is withdrawn from the second section in a generally axial direction within the flow path of axially diminishing radius $E_1$ to contact the fan blade spokes 165a and pass generally axially into the sealed annular flow space F surrounding the cylindrical filter or screen 166. The air stream passing through the filter 166 is withdrawn through the annular flow path of axially diminishing radius $F_1$ and, after contacting the fan blade spokes 166a, flows axially into the clean air outlet 167 and on to the source of suction motivating the air stream. The conditions of boundary layer action in the sealed annular flow spaces D, E and F are similar to those described in relation to the sealed annular flow spaces A, B and C and the embodiment described in FIGS. 1 and 2 and the deposited solids in each of the sections are collected and discharged in comparable manner to that described in the FIG. 1, 2 embodiment.

While the invention has been described and illustrated with reference to the above-described specific embodiments thereof, it is to be understood that the invention and its principle of operation are susceptible to a wide variety of embodiments, and the foregoing specific description and the illustrations herein are not to be interpreted in any limiting sense otherwise than as specifically set forth in the appended claims.

What I claim as my invention is:

1. Apparatus for separating solid particles from gases containing the same, said apparatus comprising:- a generally cylindrical separator drum mounted for rotation about its cylindrical axis, said separator drum being formed with at least one axially spaced separator section having a periphery formed of foraminous material adapted for flow of gas therethrough and gas impermeable material forming a peripheral gas flow space radially inwardly of said foraminous material forming said periphery and, with the exception of the last of said sections, communicating in a generally axial direction with an annular space radially outward from the periphery of an adjacent section, the gas flow space of the last of said sections communicating with a source of suction; radially oriented fan blades disposed within said gas flow space between said sections fixed to said separator drum to rotate therewith; and radially outwardly extending air seal flanges extending outwardly from the periphery of the drum at each end of each of said sections; motor means for rotating said separator drum at a predeterminable operational rate of rotation; cover means enclosing said separator drum arranged to provide an annular space between the periphery of the drum and the inside of the cover means, said cover means having a plurality of radially inwardly projecting circumferential, cross-sectionally U-shaped flanges adapted to co-operate with each of the air seal flanges on the drum to provide an air seal between the separator sections of the separator drum in the annular space between the drum periphery and the cover means; dirty gas inlet means to a first of said separator sections arranged to deliver dirty gas to the annular space between the periphery of the drum and the cover means of the first of said separator sections; deposited solids collection and removal means associated with each of said separator sections; clean gas removal means associated with a last of said separator sections of said drum, operatively connecting the latter to said suction means; chute means for guiding deposited solids from the outer periphery of the annular space between the drum periphery and the drum cover in each of said sections to said deposited solids collection and removal means; whereby, in operation the rotation of said drum and the movement of dirty gas through the apparatus sets up a boundary layer surrounding the foraminous periphery of each of said separating sections in which solid particles are thrown outwardly to be directed to said deposited solids and removal means under guidance of said chute means.

2. Apparatus according to claim 1 wherein the separator drum is mounted upon a horizontal shaft and the deposited solids collection and removal means are located centrally below the said shaft.

3. Apparatus according to claim 2 wherein the dirty gas inlet means is arranged to direct a stream of dirty gas upwardly, substantially tangentially to the upwardly moving periphery of the separator drum in the annular space between the periphery of said drum and the cover means of the first of the separator sections.

4. Apparatus according to claim 2 wherein the dirty gas inlet means is arranged to direct a stream of dirty gas horizontally substantially tangentially to the top of the periphery of the separator drum in the direction of rotation thereof in the annular space between the periphery of said drum and the cover means of the first of the separator sections.

5. Apparatus according to claim 2 wherein the dirty gas inlet means is arranged to direct a stream of dirty gas downwardly substantially tangentially to the downwardly moving periphery of the separator drum in the annular space between the periphery of said drum and the cover means of the first of said separator sections.

6. Apparatus according to claim 2 wherein the diameter of the periphery formed of foraminous material of the separator drum in successive separator sections is reduced to correspond with the inner diameter of the peripheral gas flow space leading from beneath the foraminous material forming the periphery of the preceding separator section to the annular space radially outward from the periphery of the drum in the successive separator section.

7. Apparatus according to claim 2 wherein the diameter of the periphery formed of foraminous material of the separator drum in successive separator sections is the same, and each successive separator section includes a generally frusto-conical gas flow deflector extending from the inner periphery of the peripheral gas flow space leading from beneath the foraminous material forming the periphery of the preceding separator section to the successive separator section, whereby gas flowing through the peripheral gas flow space radially inwardly of the foraminous material forming the periphery of the separator drum in a preceding separator section is delivered to the peripheral space surrounding the periphery of the separator drum formed of foraminous material of the succeeding separator section.

8. Apparatus according to claim 7 wherein there are three separator sections.

9. Apparatus according to claim 8 in which the periphery formed of foraminous material, in at least the first two separator sections, comprises a cylindrical structural support element having large openings overlaid with a wire screen having a selected mesh size.

10. Apparatus according to claim 9 in which the periphery formed of foraminous material in the third separator section comprises a cylindrical structural support element having large openings, overlaid with a filter cloth.

11. Apparatus according to claim 10 in which the said filter cloth is made from fine mesh polypropylene screen.

12. Apparatus according to claim 10 in which the said filter cloth is made from glass fiber.

13. Apparatus according to claim 10 in which the said filter cloth is made from very fine mesh stainless steel screen.

14. Apparatus according to claim 10 in which means are provided for removing solids deposited on said filter cloth.

15. Apparatus according to claim 14 in which the said means for removing solids deposited on said filter cloth comprises a compressed air delivery tube fixedly mounted in the annular space surrounding the filter cloth and parallel to and adjacent the downwardly moving surface thereof, said compressed air delivery tube having a narrow longitudinal slot therein superposing the filter cloth throughout the length thereof arranged, upon actuation of said means to direct a blast of compressed air downwardly and inwardly towards said filter cloth.

16. Apparatus according to claim 15 including actuating means for said compressed air delivery tube comprising: pressure sensing means for sensing the pressure differential between the annular space surrounding said filter cloth and the clean air outlet of the separator; a compressed air supply line connected to said compressed air delivery tube and to a source of compressed air at a pressure of at least 75 psi; a solenoid valve controlling the flow of compressed air through said supply line; and actuating means for said valve responsive to said pressure differential adapted to open said valve when said pressure differential rises beyond a predetermined value, to direct a blast of compressed air at said filter cloth and to close said valve after a predetermined elapsed time following the opening thereof.

* * * * *